US010428172B2

(12) United States Patent
Eklund et al.

(10) Patent No.: US 10,428,172 B2
(45) Date of Patent: Oct. 1, 2019

(54) REACTIVE POLYURETHANE ADHESIVE COMPOSITION, POLYURETHANE PREPOLYMER, AND FLEXIBLE LAMINATES INCLUDING THE SAME

(71) Applicant: H.B. Fuller Company, St. Paul, MN (US)

(72) Inventors: Wayne G. Eklund, Scandia, MN (US); Anthony J. Ostlund, Centerville, MN (US); Stephen G. Rippe, White Bear Lake, MN (US); XiaJi Dai, Xin Zhuang (CN)

(73) Assignee: H.B. Fuller Company, St. Paul, MN (US)

( * ) Notice: Subject to any disclaimer, the term of this patent is extended or adjusted under 35 U.S.C. 154(b) by 40 days.

(21) Appl. No.: 15/490,374

(22) Filed: Apr. 18, 2017

(65) Prior Publication Data

US 2017/0313807 A1   Nov. 2, 2017

Related U.S. Application Data

(60) Provisional application No. 62/329,622, filed on Apr. 29, 2016.

(51) Int. Cl.

| | |
|---|---|
| *C08G 18/36* | (2006.01) |
| *C08G 18/10* | (2006.01) |
| *C08G 18/12* | (2006.01) |
| *B32B 27/08* | (2006.01) |
| *B32B 27/32* | (2006.01) |
| *B32B 27/36* | (2006.01) |
| *B32B 7/12* | (2006.01) |
| *B32B 37/12* | (2006.01) |
| *C09J 7/02* | (2006.01) |
| *C09J 175/04* | (2006.01) |
| *C09J 7/29* | (2018.01) |
| *C09J 133/00* | (2006.01) |
| *C08G 18/48* | (2006.01) |
| *C08G 18/66* | (2006.01) |
| *C08G 18/76* | (2006.01) |
| *C08G 18/80* | (2006.01) |

(52) U.S. Cl.
CPC ............. *C08G 18/36* (2013.01); *B32B 7/12* (2013.01); *B32B 27/08* (2013.01); *B32B 27/32* (2013.01); *B32B 27/36* (2013.01); *B32B 37/12* (2013.01); *C08G 18/10* (2013.01); *C08G 18/12* (2013.01); *C08G 18/4825* (2013.01); *C08G 18/6696* (2013.01); *C08G 18/7671* (2013.01); *C08G 18/8051* (2013.01); *C09J 7/29* (2018.01); *C09J 133/00* (2013.01); *C09J 175/04* (2013.01); *B32B 2037/1253* (2013.01); *B32B 2250/02* (2013.01); *B32B 2250/24* (2013.01); *B32B 2255/10* (2013.01); *B32B 2255/26* (2013.01); *B32B 2323/046* (2013.01); *B32B 2367/00* (2013.01); *B32B 2375/00* (2013.01); *C09J 2475/00* (2013.01)

(58) Field of Classification Search
CPC ........ B32B 2037/1253; B32B 2250/02; B32B 2250/24; B32B 2255/10; B32B 2255/26; B32B 2323/046; B32B 2367/00; B32B 2375/00; B32B 27/08; B32B 27/32; B32B 27/36; B32B 37/12; B32B 7/12; C08G 18/12; C08G 18/36; C08G 18/4825; C08G 18/6696; C08G 18/7671; C08G 18/8051; C09J 133/00; C09J 175/04; C09J 2475/00; C09J 7/29
USPC .................. 428/423.1, 425.8, 425.9; 528/65
See application file for complete search history.

(56) References Cited

U.S. PATENT DOCUMENTS

| | | | | |
|---|---|---|---|---|
| 3,037,947 | A * | 6/1962 | Elkin ................. | C08G 18/6696 521/118 |
| 4,217,254 | A * | 8/1980 | Legue .................... | C08G 18/36 525/130 |
| 5,504,145 | A | 4/1996 | Treasurer | |
| 6,524,978 | B1 * | 2/2003 | Moore ............... | C08G 18/0828 428/95 |
| 8,097,079 | B2 | 1/2012 | Terada et al. | |
| 8,382,937 | B2 | 2/2013 | Simons | |
| 2012/0055668 | A1 * | 3/2012 | Wu .................... | C08G 18/0823 166/250.01 |
| 2014/0255560 | A1 | 9/2014 | Eklund et al. | |
| 2014/0322400 | A1 | 10/2014 | Carlson et al. | |
| 2015/0183383 | A1 | 7/2015 | Park et al. | |
| 2017/0002240 | A1 * | 1/2017 | Ostlund ............. | C08G 18/4825 |

FOREIGN PATENT DOCUMENTS

WO   WO-9967310 A1 * 12/1999   ......... C08G 18/0814

\* cited by examiner

*Primary Examiner* — Thao T Tran
(74) *Attorney, Agent, or Firm* — Kirsten Stone; Allison Johnson

(57) ABSTRACT

A polyurethane adhesive composition that includes a polyurethane prepolymer that includes the reaction product of a first polyol component that includes glycerol monoester and a polyisocyanate, and a second polyol. A polyurethane prepolymer that includes the reaction product of glycerol monoester, a hydroxy functional triglyceride, and a polyisocyanate.

24 Claims, No Drawings

REACTIVE POLYURETHANE ADHESIVE COMPOSITION, POLYURETHANE PREPOLYMER, AND FLEXIBLE LAMINATES INCLUDING THE SAME

CROSS REFERENCE TO RELATED APPLICATIONS

This application claims the benefit of U.S. Application No. 62/329,622 filed Apr. 29, 2016, which is incorporated herein.

BACKGROUND

The invention is directed to a polyurethane adhesive composition that is derived from a glycerol monoester.

Flexible packaging materials are widely used in a variety of areas including food packaging. Flexible packaging is often constructed from film laminates in which a layer of laminating adhesive is disposed between a first film (e.g., a polyethylene terephthalate, polyamide or cellophane film) and a second film. Laminates are often used in food packaging because a desired film property cannot be achieved with a single layer or type of film. By combining films having different properties in the form of a laminate, a desired property or combination of properties can be achieved.

Laminates are typically constructed to have a strong cured bond that is resistant to delaminating stresses resulting from stresses imposed on the laminate when the laminate is formed into other articles such as pouches and bags (e.g., by heat welding) or when the laminate is used. These stresses can include exposure to heat, cold, and humidity and exposure to a variety of compositions that are often stored in bags made from such laminates including, e.g., tomato sauce. Substrates used in food laminates often include metallized films and polyolefin films that exhibit low surface energy. It can be difficult to form strong adhesive bonds to metallized substrates and to substrates with low surface energy.

Polyurethane adhesives have been used in flexible packaging laminates. Polyurethane adhesive compositions are often derived from a two part system in which a first part (e.g., a polyurethane prepolymer) is reacted with a second part (e.g., a polyol). Polyurethane prepolymers are often prepared by blending a liquid polyol with a polyisocyanate.

Glycerol monostearate is a polyol in the form of a white, flaky powder that is solid at room temperature. Glycerol monostearate is reported to have a melting point from 58° C. to 59° C. and is insoluble in water.

There is a need for polyurethane adhesive compositions that are suitable for use in flexible packaging laminates and that exhibit good adhesive properties under a variety of conditions and to a variety of substrates.

SUMMARY

In one aspect, the invention features a polyurethane adhesive composition that includes a polyurethane prepolymer that includes the reaction product of a first polyol component including glycerol monoester and polyisocyanate, and a second polyol. In one embodiment, the second polyol includes a hydroxy functional triglyceride. In another embodiment, the second polyol includes castor oil, hydroxy functionalized soybean oil, hydroxy functionalized rapeseed oil, hydroxy functionalized palm oil, or a combination thereof. In other embodiments, the glycerol monoester includes glycerol monostearate. In some embodiments, the glycerol monoester includes glycerol monostearate and the second polyol includes castor oil. In other embodiments, the glycerol monoester includes glycerol monoricinoleate, glycerol monooleate, glycerol monolaurate, or a combination thereof.

In one embodiment, the first polyol component further includes a third polyol, the third polyol being different from the glycerol monoester. In some embodiments, the third polyol includes a hydroxy functional triglyceride. In other embodiments, the second polyol includes a hydroxy functional triglyceride and the third polyol includes a hydroxy functional triglyceride. In another embodiment, the second polyol includes a hydroxy functional triglyceride that includes castor oil, hydroxy functionalized soybean oil, hydroxy functionalized rapeseed oil, hydroxy functionalized palm oil, or a combination thereof, and the third polyol includes a hydroxy functional triglyceride that includes castor oil, hydroxy functionalized soybean oil, hydroxy functionalized rapeseed oil, hydroxy functionalized palm oil, or a combination thereof. In another embodiment, at least one of the second polyol and the third polyol includes a polyalkylene glycol.

In some embodiments, the second polyol includes a polyalkylene glycol.

In other embodiments, the polyurethane prepolymer includes a ratio of isocyanate groups to hydroxyl groups of from about 1.5:1 to about 10:1. In another embodiment, the polyurethane prepolymer includes from 5% by weight to 25% by weight isocyanate groups. In one embodiment, the polyurethane prepolymer includes isocyanate groups and the second polyol includes hydroxyl groups and the ratio of the isocyanate groups of the prepolymer to the hydroxyl groups of the second polyol is from about 1.75:1 to about 0.8:1.

In another embodiment, the polyurethane adhesive composition further includes silane. In other embodiments, the polyurethane adhesive composition further includes organic solvent.

In one embodiment, the composition exhibits an initial viscosity of no greater than about 8000 centipoise at 25° C. In some embodiments, the composition exhibits no greater than a 100% increase in viscosity after eight minutes at 35° C. In other embodiments, the composition exhibits no greater than a 100% increase in viscosity after twelve minutes at 35° C.

In another embodiment, the composition exhibits a 180° Peel of at least 300 grams per linear 25 millimeters when tested according to the 180° Peel Adhesion Test Method. In other embodiments, the composition exhibits a 180° peel of at least 400 grams per linear 25 millimeters when tested according to the 180° Peel Adhesion Test Method.

In other embodiments, the composition exhibits a 180° T Peel of at least 300 grams per linear 25 millimeters when tested according to the 180° T Peel Adhesion Test Method. In other embodiments, the composition exhibits a 180° T peel of at least 400 grams per linear 25 millimeters when tested according to the 180° T Peel Adhesion Test Method.

In another aspect, the invention features a polyurethane adhesive composition that includes a reaction product of a first part that includes a polyurethane prepolymer that includes a reaction product of a first polyol component that includes glycerol monoester and polyisocyanate, and a second part that includes a second polyol. In some embodiments, the first part includes isocyanate groups, the second part includes hydroxyl groups, and the ratio of the isocyanate groups of the first part to the hydroxyl groups of the second part is from about 1.75:1 to about 0.8:1. In one embodiment, the composition exhibits a 180° peel of at least 300 grams per linear 25 millimeters when tested according to the 180° Peel Adhesion Test Method. In other embodiments, the composition exhibits a 180° peel of at least 400 grams per linear 25 millimeters when tested according to the 180° Peel Adhesion Test Method.

In other aspects, the invention features a polyurethane adhesive composition that includes a first part that includes a polyurethane prepolymer that includes the reaction product of a first polyol component that includes glycerol monoester, and polyisocyanate, and a second part including a second polyol. In one embodiment, the first part includes isocyanate groups and the second part includes hydroxyl groups and the ratio of the isocyanate groups of the first part to the hydroxyl groups of the second part is from about 1.75:1 to about 0.8:1.

In another aspect, the invention features a polyurethane prepolymer that includes the reaction product of glycerol monoester, hydroxy functional triglyceride, and polyisocyanate. In one embodiment, the glycerol monoester includes glycerol monostearate, glycerol behenate, glycerol monoricinoleate, glycerol monooleate, glycerol mono octanoate, glycerol mono undecylenate, glycerol monolaurate, glycerol monoacetate, glycerol monovalerate, glycerol monocaproate, glycerol monopalmitate, glycerol monocaprylate, glycerol monococoate, or a combination thereof. In other embodiments, the hydroxy functional triglyceride includes castor oil, hydroxy functionalized soybean oil, hydroxy functionalized rapeseed oil, hydroxy functionalized palm oil, or a combination thereof.

In other aspects, the invention features a method of making a polyurethane adhesive composition, the method including combining a first part that includes a polyurethane prepolymer including the reaction product of a first polyol component that includes glycerol monoester and polyisocyanate, and a second part that includes a second polyol.

In other aspects, the invention features a laminate that includes a first layer, a polyurethane adhesive composition, and a second layer bonded to the first layer through the polyurethane adhesive composition, the polyurethane adhesive composition including a reaction product of a polyurethane prepolymer that includes a reaction product of a first polyol component that includes glycerol monoester and polyisocyanate, and a second polyol. In some embodiments, the first layer includes a polymer film layer that includes polypropylene, polyethylene, printed polyethylene terephthalate, metallized polyethylene terephthalate, metallized oriented polyolefin, polyimide, metal foil, printed oriented polyolefin, or a combination thereof. In another embodiment, the laminate is free of visible gaps and bubbles. In other embodiments, the laminate is free of delamination when tested according to the Boiling Water Test Method.

In one other aspect, the polyurethane adhesive composition includes organic solvent and a polyurethane prepolymer derived from glycerol monoester, hydroxy functional triglyceride, and polyisocyanate. In some embodiments, the polyurethane prepolymer exhibits an NCO:OH ratio of from about 1.5:1 to about 3:1. In other embodiments, the polyurethane prepolymer exhibits an NCO:OH ratio of from about 1.5:1 to about 2.5:1. In one embodiment, the polyurethane prepolymer includes from about 2% to about 25% NCO. In some embodiments, the polyurethane prepolymer includes from about 2% NCO to about 10% NCO. In other embodiments, the polyurethane prepolymer includes from about 5% NCO to about 10% NCO. In one embodiment, the polyurethane prepolymer exhibits an initial viscosity of no greater than about 150,000 cP at 25° C. In another embodiment, the polyurethane prepolymer exhibits an initial viscosity of no greater than about 100,000 cP at 25° C.

The invention features a polyurethane adhesive composition that exhibits good adhesion to flexible packaging substrates such as flexible polymer films, metallized polymer films, and foils.

Other features and advantages will be apparent from the following description of the preferred embodiments and from the claims.

DETAILED DESCRIPTION

The polyurethane adhesive composition includes the reaction product of a first part that includes a polyurethane prepolymer and a second part that includes a polyol. The polyurethane prepolymer and the polyol preferably are combined in amounts such that the ratio of isocyanate groups (NCO) present on the polyurethane prepolymer to hydroxyl groups (OH) present on the polyol is from about 2:1 to about 0.8:1, from about 1.75:1 to about 0.8:1, or even from about 1.5:1 to about 1:1. The polyurethane adhesive composition preferably exhibits an initial viscosity of no greater than 10,000 centipoise (cP), or even no greater than 8000 cP at 25° C., and an increase in viscosity of no greater than 100% after eight minutes at 35° C., or even after twelve minutes at 35° C.

The polyurethane adhesive composition preferably exhibits a 180 degree (°) peel adhesion of at least 300 grams per linear 25 millimeters (mm), or even at least 400 grams per linear 25 mm after curing for 24 hours at 23° C. when tested according to the 180° Peel Adhesion Test Method, and a 180° T peel of at least 150 grams per linear 25 mm (g/25 mm), at least 200 grams per linear 25 mm, at least 250 grams per linear 25 mm, at least 275 grams per linear 25 mm, or even destruct when tested according to the 180° T Peel Adhesion Test Method at 66° C. Destruct occurs when at least one of the substrates breaks, where ink, when present, detaches or splits from one of the substrates, a metallized surface, when present, detaches or splits from one of the substrates, or a combination thereof occurs.

The polyurethane adhesive composition preferably exhibits good adhesion to polymer film substrates, metallized polymer film substrates, foil substrates and combinations thereof, and passes the Boiling Water Test Method.

Polyurethane Prepolymer

The polyurethane prepolymer of the polyurethane adhesive composition includes the reaction product of a first polyol component and a polyisocyanate. The polyurethane prepolymer preferably has a NCO:OH ratio of from about 10:1 to about 1.5:1, from about 8:1 to about 2:1, from about 5:1 to about 2:1, or even from about 4:1 to about 3.5:1. The polyurethane prepolymer preferably exhibits an initial viscosity of no greater than 15,000 cP, no greater than 10,000 cP, no greater than 8000 cP, or even no greater than 3000 cP at 25° C.

First Polyol Component

The first polyol component used to form the polyurethane prepolymer includes a glycerol monoester. Useful classes of glycerol monoesters include glycerol monoesters that are solid at room temperature (e.g., glycerol monostearate) and glycerol monoesters that are liquid at room temperature. Glycerol monoesters that are solid at room temperature can be in a variety of forms including, e.g., particulate (e.g., powder and granular), pellets, and mixtures thereof. Suitable glycerol monoesters include, e.g., glycerol monostearate, glycerol behenate, glycerol monoricinoleate, glycerol monooleate, glycerol mono octanoate, glycerol mono undecylenate, glycerol monolaurate, glycerol monoacetate, glycerol monovalerate, glycerol monocaproate, glycerol monopalmitate, glycerol monocaprylate, glycerol monococoate, and mixtures thereof. The first polyol component preferably includes 100% by weight, from about 95% by weight to about 5% by weight, from about 80% by weight to about 20% by weight, from about 70% by weight to about 30% by weight, or even from about 60% by weight to about 40% by weight glycerol monoester.

The first polyol component optionally includes at least one additional polyol. Suitable additional polyols include, e.g., diols, triols, and mixtures thereof. Preferred additional polyols have hydroxy functionality of at least about 1.5, at least about 2, no greater than about 4, or even no greater than about 3. One particularly useful class of additional polyols is hydroxy functional triglycerides, suitable examples of which include castor oil, hydroxy functionalized natural oils including, e.g., hydroxy functionalized linseed oil, hydroxy functionalized soybean oil, hydroxy functionalized tall oil, hydroxy functionalized lung oil, hydroxy functionalized palm oil, hydroxy functionalized rapeseed oil, hydroxy functionalized safflower oil, hydroxy functionalized corn oil, hydroxy functionalized sunflower oil, hydroxy functionalized olive oil, hydroxy functionalized canola oil, hydroxy functionalized sesame oil, hydroxy functionalized cottonseed oil, hydroxy functionalized fish oil, and hydroxy functionalized peanut oil, and combinations thereof.

Suitable commercially available hydroxy functional triglycerides are available under a variety of trade designations including, e.g., under the #1 Castor Oil trade designation from Acme-Hardesty Co. (Blue Bell, Pa.) under the AGROL series of trade designations including, e.g., AGROL 2.0, AGROL 3.6, AGROL 4.0, AGROL 3.0 AO from BioBased Technologies (Springdale, Ark.).

Other useful classes of polyols include, e.g., polyols, polyether polyols, polyester polyols, specialty polyols (e.g., polybutadiene polyols, hydrogenated polybutadiene polyols, polycarbonate polyols, hydroxy alkyl derivatives of bisphenol A (e.g., bis(2-hydroxyethyl)bisphenol A), acrylic polyols, alkylene oxide adducts of polyphenols, and polyhydroxy sulfide polymers.

Suitable polyols include, ethane-1,2-diol, propane diols (e.g., 1,2-propanediol and 1,3-propanediol), butane diols (e.g., 1,2-butanediol, 1,3-butanediol, and 1,4-butanediol), 1,3-butenediol, 1,4-butenediol, 1,4-butynediol, pentane diols (e.g., 1,5-pentanediol), pentenediols, pentynediols, 1,6-hexanediol, 1,8-octanediol, 1,10-decanediol, neopentyl glycol, diethylene glycol, triethylene glycol, tetraethylene glycol, 1,4-cyclohexanedimethanol, 1,4-cyclohexanediol, dimer diols, glycerol, tetramethylene glycol, polytetramethylene ether glycol, 3-methyl-1,5-pentanediol, 1,9-nonanediol, 2-methyl-1,8-octanediol, trimethylolpropane, pentaerythritol, sorbitol, glucose, hydrogenated bisphenol A, and hydrogenated bisphenol F), aromatic polyols (e.g., bisphenol A and bisphenol F), and mixtures thereof.

Suitable polyether polyols include, e.g., polyalkylene glycols (e.g., polyethylene glycol, polypropylene glycol, polytetramethylene glycol, and combinations thereof), and other polyether polyols derived from the reaction product of a variety of polyols (e.g., ethylene glycol, propylene glycol, butane diol, hexane diol, glycerol, trimethylolethane, trimethylolpropane, pentaerythritol, cyclohexane dimethanol, bisphenol A, triethanolamine, and mixtures thereof) and alkylene oxides (e.g., ethylene oxide, propylene oxide, and butylene oxide, and mixtures thereof), fluorinated polyether polyols, and combinations thereof.

Suitable commercially available polyether polyols are available under a variety of trade designations including, e.g., under the VORANOL series of trade designations including, e.g., VORANOL 220-56, VORANOL 220-110, VORANOL 220-260, VORANOL 230-56, VORANOL 230-110, and VORANOL 230-238 from Dow Chemical Co. (Midland, Mich.).

Useful polyester polyols are prepared from the reaction product of polycarboxylic acids, their anhydrides, their esters or their halides, and a stoichiometric excess of polyhydric alcohol. Poly-carboxylic acids useful for forming polyester polyols include, e.g., dicarboxylic acids and tricarboxylic acids including, e.g., aromatic dicarboxylic acids, anhydrides and esters thereof (e.g. terephthalic acid, isophthalic acid, dimethyl terephthalate, diethyl terephthalate, phthalic acid, phthalic anhydride, methyl-hexahydrophthalic acid, methyl-hexahydrophthalic anhydride, methyl-tetrahydrophthalic acid, methyl-tetrahydrophthalic anhydride, hexahydrophthalic acid, hexahydrophthalic anhydride, and tetrahydrophthalic acid), aliphatic dicarboxylic acids and anhydrides thereof (e.g. maleic acid, maleic anhydride, succinic acid, succinic anhydride, glutaric acid, glutaric anhydride, adipic acid, pimelic acid, suberic acid, azelaic acid, sebacic acid, chlorendic acid, 1,2,4-butanetricarboxylic acid, decanedicarboxylic acid, octadecartedicarboxylic acid, dimeric acid, dimerized fatty acids, trimeric fatty acids, and fumaric acid), alicyclic dicarboxylic acids (e.g., 1,3-cyclohexanedicarboxylic acid, and 1,4-cyclohexanedicarboxylic acid), and mixtures thereof.

Suitable polyhydric alcohols from which polyester polyols can be derived include aliphatic polyols (e.g., ethylene glycols, propane diols (e.g., 1,2-propanediol and 1,3-propanediol), butane diols (e.g., 1,2-butanediol, 1,3-butanediol, and 1,4-butanediol), 1,3-butenediol, 1,4-butenediol, 1,4-butynediol, pentane diols (e.g., 1,5-pentanediol), pentenediols, pentynediols, 1,6-hexanediol, 1,8-octanediol, 1,10-decanediol, neopentyl glycol, diethylene glycol, triethylene glycol, tetraethylene glycol, polyethylene glycols, propylene glycol, dipropylene glycol, tripropylene glycol, 1,4-cyclohexanedimethanol, 1,4-cyclohexanediol, dimer diols, glycerol, polytetramethylene ether glycol, 3-methyl-1,5-pentanediol, 1,9-nonanediol, 2-methyl-1,8-octaanediol, trimethylolpropane, pentaerythritol, sorbitol, glucose, hydrogenated bisphenol A, and hydrogenated bisphenol F), aromatic polyols (e.g., bisphenol A and bisphenol F), and mixtures thereof.

Suitable commercially available polyester polyols are available under a variety of trade designations including, e.g., under the STEPANPOL series of trade designations including, e.g., BC180, PC1011-55, PC1011-210, PC-1017P-55, PC-1028P-210, PC-1040P-55, PC-107-110, PC-2011-225, PC-2019-55, PC-207-125, PC-5040-167, PC-5070P-56, PD-195, PD320, PDP-70, and PS-2002 from Stepan Company (Evansville, Ill.)

The first polyol component optionally includes from 0% by weight to about 95% by weight, from about 5% by weight to about 90% by weight, from about 20% by weight to about 80% by weight, from about 30% by weight to about 70% by weight, from about 40% by weight to about 60% by weight polyol other than the glycerol monoester.

Polyisocyanate

Polyisocyanates useful in the preparation of the polyurethane prepolymer have at least two isocyanate groups and include, e.g., aliphatic, cycloaliphatic, araliphatic, arylalkyl, alkylaryl, and aromatic isocyanates, monomeric isocyanates, oligomerie isocyanates, polymeric isocyanates, diisocyanates, triisocyanates, tetraisocyanates, carbodiimide modified isocyanates, allophonate modified isocyanates, biuret modified isocyanates, isocyanurate modified isocyanates, and mixtures thereof. Useful aromatic polyisocyanates include, e.g., diphenylmethane diisocyanate compounds (MDI) including its isomers, carbodiimide modified MDI, allophonate modified MDI, biuret modified MDI, diphenylmethane 4,4'-diisocyanate, diphenylmethane 2,2'-diisocyanate, diphenylmethane 2,4'-diisocyanate, oligomeric MDI, polymeric MDI, isomers of naphthalene diisocyanate, isomers of triphenylmethane triisocyanate, toluene diisocyanates (TDI) (e.g., 2,4-TDI and 2,6-TDI), and mixtures thereof.

Other suitable diisocyanates include, e.g., 1,3-cyclopentane diisocyanate, 1,4-cyclohexane diisocyanate, 1,3-cyclohexane diisocyanate, hydrogenated MDI (i.e., dicyclohexylmethane diisocyanate, $H_{12}$-MDI), methyl 2,4-cyclohexanediisocyanate, methyl 2,6-cyclohexanediisocyanate, 1,4-bis(isocyanatomethyl)cyclohexane, 1,3-bis(isocyanatomethyl)cyclohexane, 4,4'-diphenyl diisocyanate, 4,4'-toluidine diisocyanate, dianilidine diisocyanate, 4,4'-diphenyl ether diisocyanate, 1,3-xylylene diisocyanate including 1,3-diisocyanato-o-xylene, 1,3-diisocyanato-p-xylene and 1,3-diisocyanato-m-xylene, 1,4 xylylene diisocyanate, omega,omega'-diisocyanato-1,4-diethylbenzene, isomers of tetramethylxylylene diisocyanate, dialkyldiphenylmethane diisocyanates, tetraalkyldiphenylmethane diisocyanates, 4,4'-dibenzyl diisocyanate, 1,3-phenylene diisocyanate, 1,4-phenylene diisocyanate, and mixtures thereof.

Examples of additional suitable diisocyanates include 1,2-diisocyanatoethane, 1,3-diisocyanatopropane, 1,2-diisocyanatopropane, 1,4-diisocyanatobutane, 1,5-diisocyanatopentane, 1,6-diisocyanatohexane (HDI) (i.e., hexamethylene diisocyanate) (e.g., 1,6-HDI and 2,6-HDI), biuret modified HDI, HDI dimer, HDI trimer, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyanatoctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl)sulfide, 2,4-diisocyanto-1-chlorobenzene, 2,4-diisocyanato-1-nitrobenzene, 2,5-diisocyanato-1-nitrobenzene, m-phenylene diisocyanate, 1-methoxy-2,4-phenylene diisocyanate, 1-methoxy-2,4-phenylene diisocyanate, 3,3'-dimethyl-4,4'-diphenylmethane diisocyanate, 1-methyl-2,4-diisocyanatocyclohexane, 1,6-diisocyanato-2,2,4-trimethylhexane, 1,6-di-isocyanato-2,4,4-trimethylhexane, 1-isocyanatomethyl-3-isocyanato-1,5,5-trimethylcyclohexane (IPDI) (i.e., isophorone diisocyanate), IPDI dimer, IPDI trimer, isocyanurate modified IPDI, chlorinated and brominated diisocyanates, phosphorus-containing diisocyanates, 4,4'-diisocyanatophenylperfluoroethane, tetramethoxybutane-1,4-diisocyanate, bisisocyanatoethyl phthalate; polyisocyanates containing reactive halogen atoms 1-chloromethylphenyl-2,4-diisocyanate, 1-bromoethylphenyl-2,6-diisocyanate, and 3,3-bischloromethyl ether-4,4'-diphenyldiisocyanate); sulfur-containing polyisocyanates; dimeric fatty acid diisocyanates, and combinations thereof.

Examples of suitable triisocyanates include 4,4',4''-triphenylmethane triisocyanate and 2,4,6-toluene triisocyanate. One example of a tetraisocyanates is 4,4'-dimethyl-2,2'-5,5'-diphenylmethane tetraisocyanate. Another suitable isocyanate is polymethylene polyphenylene polyisocyanate.

Useful commercially available isocyanates are available under a variety of trade designations including, e.g., under the RUBINATE and SUPRSEC series of trade designations including, e.g., RUBINATE M, RUBINATE 1285 (polymeric MDI), RUBINATE 44, SUPRASEC 2004 MDI, SUPRASEC 1680, and SUPRUSEC 9561 (carbodiimide modified MDI) from Huntsman (Freeport, Tex.), and the TOLONATE series of trade designations including, e.g. TOLONATE HDT and TOLONATE HDB from Vencorex Freeport, Tex.), and the VESTANAT series of trade designations including, e.g., VESTANAT TI 890/100 and VESTANAT I from Evonic (Parsippany, N.J.)

Polyisocyanate Monomer

The composition that includes the polyurethane prepolymer optionally includes excess polyisocyanate monomer, e.g., from 0% by weight to about 60% by weight, from about 10% by weight to about 50% by weight, from about 15% by weight to about 55% by weight, or even from about 20% by weight to about 50% by weight polyisocyanate monomer.

Second Polyol

The second polyol from which the polyurethane adhesive composition is derived includes any suitable polyol or combinations of polyols including the polyols set forth above, which are incorporated herein. The second polyol can be the same as or different from the polyol from which the polyurethane prepolymer is derived. One particularly useful class of polyols is hydroxy functional triglycerides, suitable examples of which include castor oil, hydroxy functionalized natural oils including, e.g., hydroxy functionalized linseed oil, hydroxy functionalized soybean oil, hydroxy functionalized tall oil, hydroxy functionalized tung oil, hydroxy functionalized palm oil, hydroxy functionalized rapeseed oil, hydroxy functionalized safflower oil, hydroxy functionalized corn oil, hydroxy functionalized sunflower oil, hydroxy functionalized olive oil, hydroxy functionalized canola oil, hydroxy functionalized sesame oil, hydroxy functionalized cottonseed oil, hydroxy functionalized fish oil, and hydroxy functionalized peanut oil, and transesterification products thereof, and combinations thereof.

The second polyol preferably exhibits an initial viscosity of no greater than 10,000 cP, no greater than 8,000 cP, no greater than 4000 cP, no greater than 3000 cP, or even no greater than 2000 cP at 25° C.

Additives

The polyurethane adhesive composition optionally includes additional components including, e.g., stabilizers, antioxidants, adhesion promoters (e.g., silanes), ultraviolet light stabilizers, rheology modifiers, colorants (e.g., pigments and dyes), fillers, surfactants, flame retardants, catalysts (e.g., organo tin catalysts (e.g., dibutyl tin dilaurate), organo bismuth catalysts, and organo zinc catalysts), organic solvent, and combinations thereof.

Use

The polyurethane adhesive composition is formed by combining the first part, which includes the polyurethane prepolymer, and the second part, which includes a polyol. The polyurethane adhesive composition can be supplied as a two-part adhesive composition in two different containers. When the polyurethane adhesive composition is in the form of a solvent-based adhesive composition, it be supplied as a two-part or a one-part adhesive composition.

The polyurethane adhesive composition is useful in a variety of applications and in or on a variety of constructions including, e.g., laminates, flexible packaging, retortable packaging, food packaging, drink packaging, and combinations thereof.

The adhesive composition also can be used on a variety of substrates including, e.g., flexible films, metal foils (e.g., aluminum foil), polymer films, oriented polymer films (e.g., monoaxially oriented polypropylene film and biaxially oriented polypropylene film), cast films (e.g., cast polypropylene), metalized polymer films (e.g., metalized polyolefins (e.g., metalized polypropylene), metalized polyethylene terephthalate, and combinations thereof), other substrates used in flexible and retortable packaging laminate constructions, cellular flexible sheet materials (e.g., polyethylene foam, polyurethane foam, sponge, foam rubber and combinations thereof), films that include a surface coating (e.g., ink), and combinations thereof. Useful metallized layers include any suitable metal including, e.g., aluminum.

Useful polymer films are prepared from a variety of polymers including, e.g., polyolefins (e.g., polypropylene, polyethylene, low density polyethylene, linear low density polyethylene, high density polyethylene, polypropylene, polyolefin copolymers, and copolymers of olefins and other comonomers), ethylene-vinyl acetate, ethylene-methacrylic acid ionomers, ethylene-vinyl-alcohols, polyesters (e.g. polyethylene terephthalate), polycarbonates, polyamides (e.g. Nylon-6 and Nylon-6,6), polyvinyl chloride, polyvinylidene chloride, polylactic acid, cellulosics, polystyrene, cellophane, and combinations thereof.

Film layers can have any suitable thickness including, e.g., less than about 250 micrometers (μm) from about 5 μm to about 150 μm, or even from about 8 μm to about 100 μm. The substrate can be surface treated to enhance adhesion using a variety of methods including, e.g., corona treatments, chemical treatments, flame treatments, and combinations thereof.

Useful film layers can also have a variety of properties including, e.g., high tensile strength, vapor barrier properties, flexibility, rigidity, resistance to thermal degradation, the ability to form a seal when heated, the ability to form a seal through ultrasonic welding, and combinations thereof.

The polyurethane adhesive composition can be applied to a substrate using any suitable technique including, e.g., intermittent coating, continuous coating, air knife, trailing blade, spraying, brushing, dipping, doctor blade, roller coating (e.g., smooth roll), gravure coating (e.g., direct gravure, reverse gravure, offset gravure, and rotogravure), engraved roller coating, wheel coating, contacting coating, transfer coating (e.g., transfer coating), flexographic coating, and combinations thereof.

Laminates that include two substrates bonded together through the polyurethane adhesive composition preferably exhibit a 180° Peel adhesion of at least 300 grams per linear inch, or even at least 400 grams per linear inch after curing for 24 hours at 23° C. when tested according to the 180° Peel Adhesion Test Method with the exception that the laminate is used in the test method instead of the laminate described in the method, and a 180° T Peel adhesion of at least 150 grams per linear 25 millimeters (mm), at least 200 grams per linear 25 mm, at least 250 grams per linear 25 mm, at least 275 grams per linear 25 mm, or even exhibits destruct when tested according to the 180° T Peel Adhesion Test Method at 66° C. with the exception that the laminate is used in the test method instead of the laminate described in the method.

The invention will now be described by way of the following examples. All parts, ratios, percentages and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from about 20° C. to about 25° C.) unless otherwise specified.

Viscosity Test Method

The viscosity is determined using a Brookfield Programmable Rheometer Model DV-III using Spindle 27 and about 10.5 gram (g) of sample material at a temperature of about 25° C.

Percentage isocyanate (NCO) Test Method

The percentage isocyanate (% NCO) is determined according to International Standard Test Method ISO-14896 Method A.

180° Peel Adhesion Test Method

The 180° peel adhesion is determined by testing a laminate using a Thwing-Albert Friction/Peel Tester Model 225-1. The laminate is prepared by applying the adhesive composition to be tested to a first substrate that is a polyethylene terephthalate (PET) film substrate having a thickness of 12 μm at an adhesive coat weight of from about 1.6 grams/square meter (g/m$^2$) to about 1.9 g/m$^2$. The coated adhesive composition is then laminated to second substrate that is a low density polyethylene (LDPE) film substrate having a thickness of from about 25 μm to about 38 μm. The laminate is allowed to cure at 25° C. and a relative humidity of 50%.

At least 5 days after the laminate has been prepared the laminate is cut into a number of 25 millimeter (mm)×250 mm sample strips. Each sample strip is separated at one end and the end of the first substrate (i.e., the LDPE film) is placed in the moving part of the peel tester and the end of the second substrate (i.e., the PET film) is placed in the stationary part of the peel tester. The LDPE film layer is peeled at a rate of 300 mm/minute for 20 seconds. The peel strength in is recorded as 180° Peel adhesion in units of g/25 mm. The average 180° Peel adhesion of three (3) samples is reported.

180° T Peel Adhesion Test Method at 66° C.

The 180° T peel adhesion of a sample at 66° C. is determined using an INSTRON 55R1115(TTD) having a BEMCO Chamber according to ASTM D 1876-01 entitled, "Standard Test Method of Peel Resistance of Adhesives (T-Peel Test)," with the exception that the test sample is maintained in a controlled environment chamber at 66° C. for 5 minutes prior to testing and the test sample is then tested in the same 66° C. controlled environment chamber.

The peel strength in is recorded as 180° T Peel adhesion in units of g/25 mm. The average 180° T Peel adhesion of three (3) samples is reported.

Boiling Water Test Method

A 304 μm×203 μm sample of laminate, the adhesive of which has been allowed to cure for at least 5 days at 25° C. and 50% relative humidity, is rolled into a loose cylindrical form and then is submerged in boiling water for 10 minutes. Tongs are used to remove the sample from the boiling water making sure that all water has drained from the laminate sample. The sample is then unrolled and allowed to cool for at least 10 minutes. The material is then observed for defects such as delamination and tunneling.

Example 1

The polyurethane prepolymer of Example 1 was prepared by combining 4.09 grams (g) of glycerol monostearate (GMS) and 36.66 g of hydroxy functional palm oil (POLYGREEN F6016, Polygreen Chemicals, Kuala Lumpur, Malaysia) in a mixing vessel, and heating the mixture (with stirring) at 82° C. until the GMS was dissolved in the palm oil. Then 59.05 g diphenylmethane diisocyanate (MDI)

was quickly added to the mixture. The mixture was held under vacuum at 82° C. for about 90 minutes or until the amount of isocyanate (NCO) was no greater than 16.5%, at which time the composition was removed from the mixing vessel. The final amount of isocyanate in Example 1 was determined to be 16.15% and the viscosity at 25° C. was 1050 centipoise (cP).

Examples 2-7

Examples 2-7 were prepared according to the method described in Example 1 with the exception that the polyurethane prepolymers of Examples 2 and 3 were prepared from castor oil instead of hydroxy functional palm oil, no oil was used in the preparation of the polyurethane prepolymer of Example 7, and the amounts of each component were as specified in Table 1. The % NCO in each polyurethane prepolymer composition was determined according to the % NCO Test Method. The viscosity of each polyurethane prepolymer was determined according to the Viscosity Test Method at 25° C. and 35° C., Where indicated, and the values are reported in Table 1 in centipoise (cP).

TABLE 1

| Example | 1 | 2 | 3 | 4 | 5 | 6 | 7 |
| --- | --- | --- | --- | --- | --- | --- | --- |
| GMS | 4.09 | 15.95 | 14.53 | 15.27 | 6.93 | 6.75 | 25.54 |
| Castor Oil | 0 | 15.95 | 14.53 | 0 | 0 | 0 | 0 |
| OH Palm Oil | 36.66 | 0 | 0 | 15.27 | 27.7 | 26.97 | 0 |
| MDI | 59.05 | 68.1 | 70.94 | 69.46 | 65.37 | 66.28 | 74.46 |
| % NCO | 16.15 | 17.06 | 18.52 | 18.55 | 18.14 | 18.24 | 18.9 |
| NCO:OH | 5.5 | 4.0 | 4.58 | 4.99 | 6.08 | 5.68 | 4.17 |
| Initial Viscosity at 25° C. (cP) | 1050 | 3900 | 700 | 750 | 750 | 800 | ND |
| Viscosity at 35° C. (cP) | ND | 1800 | ND | ND | ND | ND | 1200 |

ND = not determined

Examples 8-18

The polyurethane adhesive compositions of Examples 8-18 were prepared by combining a polyurethane prepolymer and a polyol component of the type and in the amounts set forth in Table 2. The percent by weight of each polyol in the polyol component is identified in Table 2. Laminates that included the polyurethane adhesive compositions of Examples 8-18 were prepared and tested according to the 180° Peel Adhesion Test Method, 180° T Peel Adhesion Test Method at 66° C., the Boiling Water Test Method, and the results are reported in Table 2 below.

TABLE 2

| Example | 8 | 9 | 10 | 11 | 12 | 13 | 14 | 15 | 16 | 17 | 18 |
| --- | --- | --- | --- | --- | --- | --- | --- | --- | --- | --- | --- |
| Prepolymer of Example | 3 | 3 | 3 | 3 | 7 | 7 | 5 | 5 | 6 | 6 | 2 |
| Castor Oil | 90 | 80 | 0 | 0 | 90 | 80 | 90 | 80 | 90 | 80 | 80 |
| OH Soy Bean Oil | 10 | 0 | 0 | 0 | 10 | 0 | 10 | 0 | 10 | 0 | 0 |
| BIOH 5000 | 0 | 20 | 0 | 0 | 0 | 20 | 0 | 20 | 0 | 20 | 0 |
| OH Palm Oil | 0 | 0 | 100 | 100 | 0 | 0 | 0 | 0 | 0 | 0 | 0 |
| Polypropylene glycol | 0 | 0 | 0 | 0 | 0 | 0 | 0 | 0 | 0 | 0 | 20 |
| % by weight Prepolymer | 45.05 | 42.53 | 32.88 | 37.5 | 45.05 | 42.53 | 45.05 | 42.53 | 45.05 | 42.53 | 46.52 |
| % by weight Polyol | 54.95 | 57.47 | 67.12 | 62.5 | 54.95 | 57.47 | 54.95 | 57.47 | 54.95 | 57.47 | 53.48 |
| NCO:OH | 1.28:1.0 | 1.28:1.0 | 1.28:1.0 | 1.27:1.0 | 1.32:1.0 | 1.32:1.0 | 1.26:1.0 | 1.32:1.0 | 1.27:1.0 | 1.27:1.0 | 1.29:1.0 |
| Viscosity at 35° C. (cP) at time zero | 875 | 625 | 2000 | 2175 | 788 | 975 | 750 | ND | 800 | ND | 975 |
| 180° Peel | D* | D | D | D | D | D | D | D | D | D | D |
| 180° T Peel at 66° C. (g/25 mm) | 232 | ND | ND | ND | ND | ND | ND | ND | ND | ND | 275 |

TABLE 2-continued

| Example | 8 | 9 | 10 | 11 | 12 | 13 | 14 | 15 | 16 | 17 | 18 |
|---|---|---|---|---|---|---|---|---|---|---|---|
| Boiling Water Test | Pass | NT | NT | NT | NT | NT | NT | NT | NT | NT | Pass |

Castor Oil = #1 Castor Oil (Acme-Hardesty Co., Blue Bell, Pennsylvania)
BIOH 5000 = hydroxy functional natural oil (Cargill, Minneapolis, Minnesota)
OH Soybean Oil = hydroxy functional soybean oil (Hairma 10100, Hairma, Guangzhou, China)
OH Palm Oil = Polygreen F6016 hydroxy functional palm oil (Polygreen Chemicals, Kuala Lumpur, Malaysia)
*D = destruct bond. The PET substrate tore during the test. It takes greater than 500 g/linear 25 mm for the PET substrate to tear.
ND = not determined Examples 8a-18g The laminates of Examples 8a-18g were prepared and tested according to the 180° Peel Adhesion Test Method with the following exceptions: the polyurethane adhesive composition, the first substrate (i.e., the primary web), and the second substrate (i.e., second web) were as identified in Tables 3 and 4, and the laminates were stored for the time specified in Tables 3 and 4 prior to testing. The results are set forth in Tables 3 and 4 in units of g/25 mm. The indicator "D" is an abbreviation for destruct and means that one or more of the substrates broke or was destroyed before the completion of the test.

positions exhibit a 180° Peel adhesion of at least 300 g/25 mm, or even at least 400 g/25 mm, when tested according to the 180° Peel Adhesion Test Method.

Suitable polyurethane prepolymers for use in a solvent-based polyurethane adhesive composition have an NCO:OH ratio of from about 1.5:1 to about 3:1 or even from about 1.5:1 to about 2.5:1, include from about 2% NCO to about 25% NCO, from about 2% NCO to about 10% NCO, from about 3.5% NCO to about 10% NCO, or even from about 5% NCO to about 10% NCO, and exhibit an initial viscosity of no greater than 150,000 cP, no greater than 100,000 cP, no greater than 80,000 cP, or even no greater than 30,000 cP at 25° C.

TABLE 3

| Example | PU Adhesive | Primary Web | Second Web | 4 hrs | 24 hrs | 4 days | 7 days | 2 weeks | 30 Days | 60 days |
|---|---|---|---|---|---|---|---|---|---|---|
| 8a | 8 | MPET[1] | PET[2] | 20 | 197 | D | D | D | D | D |
| 9a | 9 | MPET | PET | 16 | 233 | 116 | 79 | D | 120/D | 148 10% metal decal/D |
| 10a | 10 | MPET | PET | 0 | 77 | 176 | 145 | D | 128 | 86/D |
| 11a | 11 | MPET | PET | 4 | 98 | 156 | 106 | D | D | 79 |
| 12a | 12 | MPET | PET | 13 | 175 | 81 | 97 | 106 | 130/D | 97/D |
| 13a | 13 | MPET | PET | 14 | 174 | 100 | 73 | D | D | 100/D |
| 14a | 14 | MPET | PET | 19 | 113 | 84 | 55 | D | D | 111/D |
| 15a | 15 | MPET | PET | 18 | 93 | 86 | 80 | 99 | 119 | 101 |
| 16a | 16 | MPET | PET | 21 | 89 | 113 | 87 | 76 | 61 | 92 |
| 17a | 17 | MPET | PET | 25 | 86 | 82 | 100 | 120 | 88 | 61 |

[1] = metallized polyethylene terephthalate
[2] = polyethylene terephthalate
* where a number is followed by a slash (/) and a D, the test sample exhibited a peel adhesion value, reflected by the reported number, prior to destruct.

TABLE 4

| Example | Adhesive | Primary Web | Second Web | 24 hrs | 48 hrs | 72[9] hrs | 1 week |
|---|---|---|---|---|---|---|---|
| 18a | 18 | PPET[3] | MPET | 177 | 127 | NT | 99 |
| 18b | 18 | PPET/MPET | LDPE[4] | 394 | 418 | NT | D |
| 18c | 18 | PET | LDPE | D | D | D | D |
| 18d | 18 | PE[5]/Foil[6] | LDPE | 676 | 684 | NT | 585 |
| 18e | 18 | PE/Foil | PET | 583 | 510 | NT | 408 |
| 18f | 18 | PE/Foil | PET | NT | NT | 474 | NT |
| 18g | 18 | BOPP[7] | MBOPP[8] | 321 | 340 | NT | 303 |

[3] = printed polyethylene terephthalate
[4] = linear low density polyethylene film having a thickness of 32 μm
[5] = polyethylene
[6] = aluminum foil having a thickness of 18 μm
[7] = biaxially oriented polypropylene having a thickness of 20 μm
[8] = metallized biaxially oriented polypropylene having a thickness of 20 μm
[9] = The results in this column reflect the boiling water test results for a sample that had been stored for 72 hours and then tested according to the Boiling Water Test Method.

All references referred to herein are incorporated herein in their entirety o the extent they do not conflict.

Other embodiments are within the claims. For example, the polyurethane adhesive composition optionally includes organic solvent. Solvent-based polyurethane adhesive com- Polyurethane prepolymers suitable for use in the solvent-based polyurethane adhesive composition are derived from glycerol monoester, hydroxy functional triglyceride, and polyisocyanate. The glycerol monoesters, hydroxy functional triglycerides, and polyisocyanates set forth above and the amounts thereof are also suitable for use in preparing polyurethane polymers suitable for use in solvent-based polyurethane adhesive composition.

Suitable organic solvents for use in the solvent-based polyurethane adhesive composition include, e.g., ketones (e.g., acetone, methylethylketone, methylisobutylketone, methyl amyl ketone, cyclohexanone and combinations thereof), alkylesters (e.g., methyl acetate, ethyl acetate, butyl acetate, isobutyl acetate, and combinations thereof), aliphatic hydrocarbons (e.g., n-hexane, n-heptane, and octane), alicyclic hydrocarbons (e.g., cyclohexane and methylcyclohexane), aromatic hydrocarbons (e.g., toluene, xylene, and ethylbenzene), halogenated aliphatic hydrocarbons (e.g., methyl chloride, methylene chloride, chloroform, carbon tetrachloride, methyl bromide, methylene iodide, and dichloroethane), and combinations thereof.

Useful solvent-based polyurethane adhesive compositions include from about 10% by weight to about 70% by weight, or even from about 10% by weight to about 60% by weight organic solvent and from about 30% by weight to about 90% by weight, or even from about 40% by weight to about 90% by weight solids (e.g., polyurethane prepolymer).

Example 19

A solvent-based polyurethane prepolymer was prepared by combining 20.5 g glycerol monostearate and 35.95 g castor oil in a mixing vessel, and heating the mixture (with stirring) at 82° C. until the glycerol monostearate was dissolved in the castor oil. The mixture was then dried at 110° C. for one hour under vacuum. Ethyl acetate in an amount of 30 g was added to the mixture followed by 43.55 g 4,4'-diphenylmethane diisocyanate was quickly added to the mixture. The mixture was held under vacuum at 82° C. for about 90 minutes or until the amount of isocyanate (NCO) was no greater than 5%, at which time the composition was removed from the mixing vessel. The final amount of isocyanate was determined to be 5% and the viscosity of the neat polymer at 25° C. was 100,000 cP.

Laminates were prepared from the polyurethane prepolymer composition of Example 19 and tested according to the 180° Peel Adhesion Test Method with the following exceptions: the period after lamination and before testing is as set forth in Table 5, the coat weight was 3.0 g/m², the first substrate was the primary web identified in Table 5, the second substrate was the second web identified in Table 5, and the solvent was evaporated from the polyurethane prepolymer composition after the composition was applied to the first substrate and before the composition was contacted with the second substrate. The laminates were then stored for the time specified in Table 5 where the hour (hrs) time intervals reflect the amount of time that had elapsed after the laminate was prepared and before it was tested. The results reported in Table 5 are in units of g/25 mm.

TABLE 5

| Example | Adhesive | Primary Web | Second Web | 2 hrs | 4 hrs | 24 hrs | 48 hrs | 1 week |
|---|---|---|---|---|---|---|---|---|
| 19 | 19 | PET | LDPE | 267 | 279 | 401 | 421 | — |

What is claimed is:
1. A polyurethane adhesive composition comprising:
a polyurethane prepolymer comprising the reaction product of
a first polyol component comprising
glycerol monostearate, and
a hydroxy functional triglyceride, and
polyisocyanate; and
a second polyol.
2. The polyurethane adhesive composition of claim 1, wherein the second polyol comprises a hydroxy functional triglyceride.
3. The polyurethane adhesive composition of claim 1, wherein the second polyol comprises castor oil, hydroxy functionalized soybean oil, hydroxy functionalized rapeseed oil, hydroxy functionalized palm oil, or a combination thereof.
4. The polyurethane adhesive composition of claim 1, wherein the second polyol comprises castor oil.
5. The polyurethane adhesive composition of claim 1, wherein
the second polyol comprises castor oil, hydroxy functionalized soybean oil, hydroxy functionalized rapeseed oil, hydroxy functionalized palm oil, or a combination thereof, and
the hydroxy functional triglyceride comprises castor oil, hydroxy functionalized soybean oil, hydroxy functionalized rapeseed oil, hydroxy functionalized palm oil, or a combination thereof.
6. The polyurethane adhesive composition of claim 1, wherein the second polyol comprises a polyalkylene glycol.
7. The polyurethane adhesive composition of claim 1, wherein the polyurethane prepolymer comprises from 5% by weight to 25% by weight isocyanate groups.
8. The polyurethane adhesive composition of claim 1, wherein the polyurethane prepolymer comprises isocyanate groups and the second polyol comprises hydroxyl groups and the ratio of the isocyanate groups of the polyurethane prepolymer to hydroxyl groups of the second polyol is from about 1.75:1 to about 0.8:1.
9. The polyurethane adhesive composition of claim 1, wherein the composition exhibits an initial viscosity of no greater than about 8000 centipoise at 25° C.
10. The polyurethane adhesive composition of claim 1, wherein the composition exhibits no greater than a 100% increase in viscosity after twelve minutes at 35° C.
11. The polyurethane adhesive composition of claim 1, wherein the composition exhibits a 180° Peel of at least 300 grams per linear 25 millimeters when tested according to the 180° Peel Adhesion Test Method.
12. The polyurethane adhesive composition of claim 1, wherein the polyurethane prepolymer is derived from 20% by weight to 80% by weight glycerol monoester based on the total weight of polyol used to make the polyurethane prepolymer.
13. The polyurethane adhesive composition of claim 1 further comprising polyisocyanate monomer.
14. A polyurethane prepolymer comprising:
the reaction product of
glycerol monostearate,
hydroxy functional triglyceride, and
polyisocyanate,
the polyurethane prepolymer comprising from 5% by weight to 25% by weight isocyanate groups.
15. The polyurethane prepolymer of claim 14, wherein the polyurethane prepolymer is derived from 20% by weight to 80% by weight glycerol monoester based on the total weight of polyol used to make the polyurethane prepolymer.
16. The polyurethane prepolymer of claim 14, wherein the polyurethane prepolymer is derived from polyol and isocyanate at a ratio of isocyanate groups to hydroxyl groups of from 10:1 to 1.5:1.
17. A polyurethane composition comprising:
the polyurethane prepolymer of claim 14; and
from 20% by weight to 50% by weight polyisocyanate monomer.
18. The polyurethane composition of claim 17, wherein the composition exhibits an initial viscosity of no greater than 15,000 centipoise at 25° C.
19. The polyurethane prepolymer of claim 14, wherein the hydroxy functional triglyceride comprises castor oil.
20. A laminate comprising:
a first layer;
a polyurethane adhesive composition; and
a second layer bonded to the first layer through the polyurethane adhesive composition,
the polyurethane adhesive composition comprising a reaction product of a polyurethane prepolymer comprising
a reaction product of a first polyol component comprising glycerol monostearate and a hydroxy functional triglyceride, and polyisocyanate; and
a second polyol.

21. The laminate of claim 20, wherein at least one layer comprises a metallized film and the polyurethane adhesive composition is in contact with the metal of the metallized film, the laminate exhibiting a 180° Peel of at least 300 grams per linear 25 millimeters when tested according to the 180° Peel Adhesion Test Method.

22. A two part polyurethane adhesive composition comprising:
a first part comprising
a polyurethane prepolymer comprising the reaction product of
a first polyol component comprising glycerol monostearate and hydroxy functional triglyceride, and polyisocyanate; and
a second part comprising a second polyol.

23. The two part polyurethane adhesive composition of claim 22, wherein the hydroxy functional triglyceride comprises castor oil.

24. The two part polyurethane adhesive composition of claim 22, wherein the first part further comprises polyisocyanate monomer.

* * * * *